United States Patent
Musser, Jr.

(10) Patent No.: US 8,954,743 B2
(45) Date of Patent: Feb. 10, 2015

(54) SYSTEM AND METHOD FOR WATERMARKING CONTENT FOR TRACKING MEDIA CONSUMPTION

(75) Inventor: Elmer G. Musser, Jr., St. James, NY (US)

(73) Assignee: Home Box Office, Inc., New York, NY (US)

( * ) Notice: Subject to any disclaimer, the term of this patent is extended or adjusted under 35 U.S.C. 154(b) by 75 days.

(21) Appl. No.: 13/040,663

(22) Filed: Mar. 4, 2011

(65) Prior Publication Data

US 2012/0224742 A1 Sep. 6, 2012

(51) Int. Cl.
*H04L 9/32* (2006.01)
*G06T 1/00* (2006.01)

(52) U.S. Cl.
CPC ........ *G06T 1/0021* (2013.01); *H04N 2201/327* (2013.01); *H04N 2201/3239* (2013.01); *H04N 2201/3226* (2013.01)
USPC .............................. 713/176; 713/178; 705/75

(58) Field of Classification Search
CPC .......... H04N 21/8358; H04N 1/32144; H04N 2201/3233; H04N 2201/327; H04N 1/32352; H04N 1/32203; H04N 21/23892; H04N 1/00037; H04N 1/32288; H04N 2201/3205; H04N 2201/3226; H04N 1/32122; H04N 1/32208
USPC ........................................................ 713/176
See application file for complete search history.

(56) References Cited

U.S. PATENT DOCUMENTS

| 5,809,139 | A * | 9/1998 | Girod et al. .................... 380/202 |
| 6,901,514 | B1 * | 5/2005 | Iu et al. .......................... 713/176 |
| 7,020,704 | B1 | 3/2006 | Lipscomb et al. |
| 2002/0077986 | A1 * | 6/2002 | Kobata et al. ................... 705/52 |
| 2003/0009670 | A1 * | 1/2003 | Rhoads ........................ 713/176 |
| 2006/0239501 | A1 * | 10/2006 | Petrovic et al. ............... 382/100 |
| 2008/0247543 | A1 * | 10/2008 | Mick et al. .................... 380/201 |
| 2009/0116686 | A1 | 5/2009 | Samtani et al. |
| 2010/0046606 | A1 * | 2/2010 | Celik et al. .............. 375/240.01 |
| 2010/0158098 | A1 | 6/2010 | McSchooler et al. |

* cited by examiner

*Primary Examiner* — Douglas W Owens
*Assistant Examiner* — Monica C King
(74) *Attorney, Agent, or Firm* — Kenyon & Kenyon LLP

(57) ABSTRACT

In a system and method of watermarking content for tracking media consumption, the method may include creating, by a computer processor, at least one copy of a mezzanine asset for distribution to at least one user, the mezzanine asset being watermarked with a watermark identifier, and the at least one copy including a copy of the watermark identifier.

26 Claims, 2 Drawing Sheets

SYSTEM AND METHOD FOR WATERMARKING CONTENT FOR TRACKING MEDIA CONSUMPTION

FIELD OF THE INVENTION

The present invention relates to a system and method for watermarking content for tracking media consumption.

BACKGROUND INFORMATION

Television and radio networks are two examples of networks in broadcast space. A network is an organization that delivers programs that may include recorded or live content, and may include movies, radio shows, and other audio and/or video content. The content may be delivered either as linear content or nonlinear content.

Linear content is provided in a serial format in which one program follows a previous program in time. A network providing linear content can provide only one program at any given moment in time. Thus, linear content follows a schedule or a timetable that users must follow to access the linear content. The scheduling of linear content involves a process of assigning content to time slots on the network. A database of the content may contain program identifiers, titles, durations and other supporting information, and the database may be organized in a serial format based on the schedule of the linear content. Thus, based on the network and the predetermined schedule, it can be determined what linear content was accessed at any particular time.

Nonlinear content, on the other hand, is scheduled within a window of time during which users may access the nonlinear content. A network providing nonlinear content may provide one program or multiple programs, e.g. a library of content, at any given moment in time. The nonlinear content is scheduled so that it is made available for access by users during a specified window of time, such as for example, a certain number of hours, days, weeks, or months. Nonlinear content may be selected by users on-demand, and may include, for example, video on demand (VOD), Web content, and/or content provided by another delivery method that does not follow a linear schedule.

Tracking media consumption is becoming increasingly complicated, for example, with the growth of Web and mobile media usage by end users, and additional varied modes of consumption available to end users. One exemplary method of tracking media consumption is watermarking, in which content is tagged with data in a manner that is not visible or audible to end users. Watermarking processes may hide the data within content so as not to cause a degradation of the content as received by users. Such watermark data may include identification marks, time stamps and other data types. Further, the recovery of watermark data may require an understanding of how the data was originally watermarked into the content. Moreover, watermarking, once added to content, cannot be removed. Accordingly, watermarking is generally added to content at the time of transmission and/or distribution after all other processing and/or conversion has been completed.

Watermark data may include, for example, audio watermarks and/or video watermarks. Audio watermarks may include audio data that is added to an existing audio stream of content at particular time increments. The audio watermarks may be added such that they are not audible to an end user. This may be accomplished, for example, by adding the audio watermark data while music, speech, and/or other audio output is present in a program such that the audio watermark data is masked by the content's music or speech. Similarly, video watermarks may include video data that is added to an existing video stream of content at particular time increments. The video watermarks may be added such that they are not visible to an end user. This may be accomplished, for example, by adding the video watermark data to corners, edges, dark sections, and/or other portions of the video stream of a program such that the video watermark data is masked by the content's video stream.

Further, the audio and/or video watermark data may be added to the content at a particular insertion rate. The particular time increments at which watermark data is added to content may depend on the desired resolution of tracking media consumption. That is, a higher frequency of watermark data insertion would provide more frequent data points, and thus higher resolution, with respect to tracking consumption, whereas a lower frequency of watermark data insertion would provide less frequent data points, and thus lower resolution, with respect to tracking consumption.

Watermark data may be recovered from content that has been accessed by users, for example, by a process called metering. In order to recover audio and/or video watermark data, a data collection device may be present at the location in which an end user accesses the content. The data collection device may then listen to (in the case of audio watermark data) and/or view (in the case of video watermark data) the content as it is output to the end user. The data collection device may be capable of identifying and recovering the watermarks that are not audible and/or visible to end users. The recovered watermarks may be processed in the data collection device and/or may be transferred to and/or processed at other processing center(s). Then, the recovered and/or processed data may be provided to networks or other entities that request such data in order to track media consumption, for example.

For watermarking linear content, the watermark data is added at the time of transmission of the content to an end user. The watermark data that is inserted into the linear content may include an identification mark and a time stamp. The identification mark may be unique to the assigned network, such that there is a one to one relationship between the identification mark and the network. Accordingly, each network may have its own unique identification mark. Further, because linear content follows a predetermined schedule, the identification mark may be used to identify the network, and the time stamp may identify the time at which content was accessed on the network, which time stamp may then be correlated with the particular content accessed by reference to the schedule and the identified network.

For watermarking nonlinear content, the watermark data is also added at the time of transmission of the content to an end user. The watermark data that is inserted into the nonlinear content may also include an identification mark and a time stamp. The identification mark may be unique to the assigned network, such that there is a one to one relationship between the identification mark and the network. Accordingly, each network may have its own unique identification mark.

However, because nonlinear content on a network may include a library of content that does not follow a predetermined schedule but rather is made available to users within a window of time, an identification of the network and a time stamp are not sufficient to identify the particular program accessed by an end user. For example, if Network A offers five Programs A1, A2, A3, A4, A5 during a particular window of time, and end user B accesses Program A5 during this window of time, merely identifying Network A and a time stamp which falls in the window of time during which all five Programs were available is not sufficient to identify the particular Program, i.e., Program A5, that was accessed by end user B. Thus, additional data related to the particular content accessed may be added to the watermark data in order to identify the particular content accessed. However, this adds additional complexity to the watermark data that is added to content, and as more data is included in watermarks, it may become more difficult to mask such watermarking within the content such that it does not detrimentally affect the content accessed by users.

Further, because nonlinear content may be accessed by multiple users from various different devices, each copy of the same nonlinear content may be uniquely watermarked, further adding complexity and resulting in a proliferation of data that must be stored and tracked. For example, if Program A1 is offered on Network A, and end users B, C, D each access Program A1 from unique devices, such as, for example, a cell phone, a computer, and a television, then three unique copies of Program A1 are processed and converted to be delivered to each requesting end user's device, and each end user B, C, D receives a unique copy of Program A1 converted to suit his/her device. Further, each unique copy of Program A1 includes unique watermark data added at the time of transmission and/or distribution to the end user. That is, because the watermark data is added to content at the time of transmission, each copy of a program, even if it is the same program on the same network, includes unique watermark data. More specifically, although the network identification may be the same for all copies of a program offered on a particular network, each copy will include a unique identifier for the program even though the underlying program is the same for all copies sent to unique devices.

Moreover, if a program is removed from the library of nonlinear content of a network so that it is no longer available and then later reassigned to the same network again and made available for access by end users, each copy of the program accessed by an end user again includes unique watermark data. Further, if a program is reassigned from one network to another network, each copy of the program accessed by an end user on the new network again includes unique watermark data. This is the case even though the actual program being accessed is the same for all the above copies on the two different networks. Thus, the amount of watermark data that must be stored and tracked in order to track consumption of a single program may become quite large. Further, the large amount of data created by the number of unique watermarks that may identify the same network and the same accessed program may lead to errors in the tracking and analysis of data. When these complexities are multiplied by the potentially large number of programs made available on a single network, the task of storing and tracking such voluminous watermark data may become extremely complicated. The problem may be further complicated when managing several networks, each of which offers a large library of content.

SUMMARY

Embodiments of the present invention may provide for tracking media consumption by using a watermark identifier inserted into an asset prior to processing and conversion for different devices used by end users to access the content. The watermark identifier may include a minimal amount of data, may remain with the asset during processing and conversion for different devices, and may also remain with the asset during reassignment to various networks. Accordingly, the watermark identifier may provide for improved and simplified tracking of media consumption across multiple distribution paths and network reassignments.

According to an example embodiment of the present invention, a computer-implemented method of watermarking content for tracking of media consumption may include creating, by a computer processor, at least one copy of a mezzanine asset for distribution to at least one user, the mezzanine asset being watermarked with a watermark identifier, and the at least one copy including a copy of the watermark identifier.

In one example variant of this embodiment, the mezzanine asset is generated by copying an asset to which a base identifier unique to the asset is assigned.

In one example variant of this embodiment, the mezzanine asset is assigned to a network, the assignment to the network being recorded by a link between the watermark identifier and a network identifier, and the network identifier includes at least one of a unique identifier and a window of time during which the mezzanine asset is available on the network.

In one example variant of this embodiment, the base identifier, the network identifier, and the watermark identifier are recorded, and linked to each other, in a database.

In one example variant of this embodiment, the at least one copy includes a copy identifier.

In one example variant of this embodiment, the copy identifier includes a unique identifier.

In one example embodiment of the method, the method may further provide for recording the copy identifier in the database, and linking the copy identifier to the base identifier, the network identifier, and the watermark identifier in the database.

In one example variant of this embodiment, the watermark identifier includes at least one of a unique identifier and a time stamp.

In one example variant of this embodiment, the time stamp is relative to a start of a running time of the mezzanine asset.

In one example variant of this embodiment, the watermark identifier is at least one of an audio watermark and a video watermark inserted into the mezzanine asset.

In one example embodiment of the method, the method may further provide for processing the at least one copy of the mezzanine asset for distribution based on requirements of the at least one user, the at least one copy maintaining the copy of the watermark identifier after the processing.

In one example embodiment of the method, the method may further provide for distributing the at least one copy of the mezzanine asset to the at least one user.

In one example variant of this embodiment, the watermark identifier of the at least one copy distributed to the at least one user is identifiable by an end user device and is processable for determining the asset and the network to which the at least one copy is linked based on links between the base identifier, the network identifier, and the watermark identifier in the database.

In one example variant of this embodiment, after reassignment of the mezzanine asset to another network, the reassignment occurring subsequent to creation of the mezzanine asset including the watermark identifier, the watermark identifier is processable for identifying the another network by a change of a link from the watermark identifier to point to a different network identifier assigned to the another network.

In one example variant of this embodiment, the mezzanine asset includes at least one of video content and audio content.

In one example variant of this embodiment, the mezzanine asset includes at least one of movies, television shows, radio shows, video-on-demand and Web content.

According to an example embodiment of the present invention, a hardware computer-readable medium having stored thereon instructions executable by a processor, the instructions which, when executed by the processor, cause the processor to perform a method of tracking media consumption, may be provided. The method may include creating at least one copy of a mezzanine asset for distribution to at least one user, the mezzanine asset being watermarked with a watermark identifier, and the at least one copy including a copy of the watermark identifier.

According to an example embodiment of the present invention, a transmission method may include transmitting instructions executable by a processor, the instructions which, when executed by the processor, cause the processor to perform a method of tracking media consumption. The tracking method may include creating at least one copy of a mezzanine asset for distribution to at least one user, the mezzanine asset being watermarked with a watermark identifier, and the at least one copy including a copy of the watermark identifier.

According to an example embodiment of the present invention, a system for tracking media consumption may include a computer processor configured to create at least one copy of a mezzanine asset for distribution to at least one user, the mezzanine asset being watermarked with a watermark identifier, and the at least one copy including a copy of the watermark identifier.

According to an example embodiment of the present invention, a computer-implemented method for tracking media consumption may include obtaining, by a computer processor, information regarding a watermark in a consumed copy of a media asset assigned to a network, based on identification links, determining, by the processor, an asset identification and a network identification to which the watermark is linked, and based on the determination, recording, by the processor, a consumption of the asset in association with the network.

According to an example embodiment of the present invention, a computer-implemented method for tracking media consumption may include: storing an identification of a media asset; storing an identification of a network to which the asset is assigned; generating a base copy of the media asset, the base copy including a watermark processable for tracking consumption of the media asset; storing an identification of the base copy; linking the stored base copy identification, the stored network identification, and the stored asset identification; and responsive to each of a plurality of user requests for the media asset: generating a respective copy of the base copy; and transmitting the respective copy of the base copy.

The respective copies may be provided as videos-on-demand.

The various features and embodiments described herein may be provided in various combinations.

DETAILED DESCRIPTION OF EXAMPLE EMBODIMENTS

Figure 1:
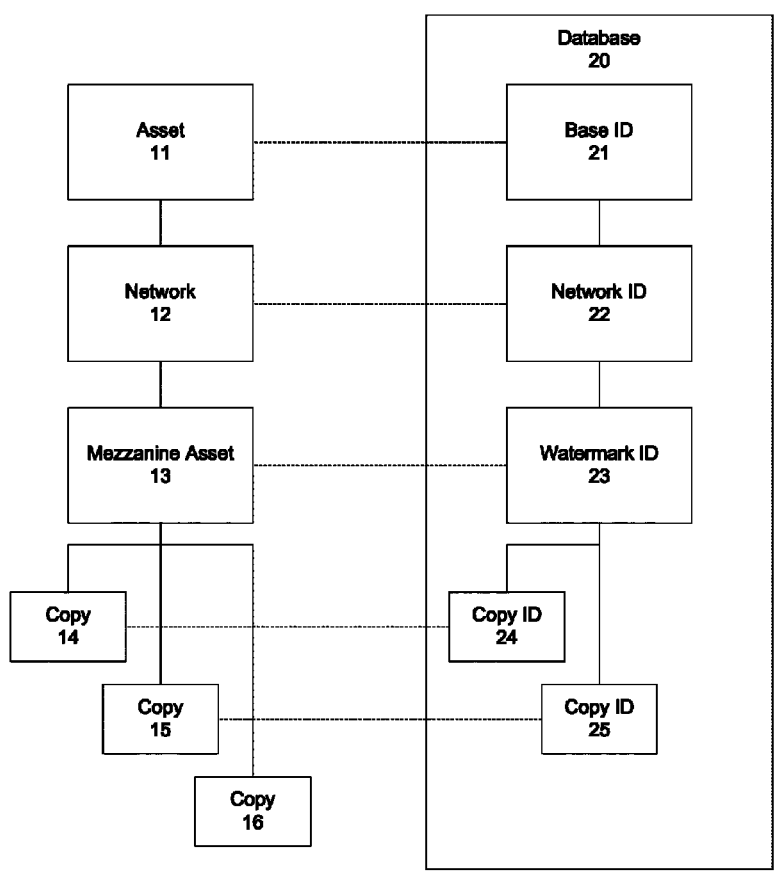
FIG. 1 is a schematic diagram illustrating an exemplary system of tracking media consumption according to an example embodiment of the present invention.

FIG. 1 illustrates a schematic diagram of an exemplary system 10 of tracking media consumption according to an example embodiment of the present invention.

As shown in FIG. 1, the system 10 may include an asset 11, a network 12, a mezzanine asset 13, copies 14, 15, 16 of the mezzanine asset 13, and a database 20. The asset 11 may include original versions, i.e., master versions, of recorded content, live content, movies, television shows, radio shows, and other audio and/or video content or programs. The network 12 may include a television, radio, or other network that delivers content to end users. The mezzanine asset 13 may be a copy, e.g., a first working copy, of the asset 11. Further, the copies 14, 15, 16 of the mezzanine asset 13 may be configured for distribution to particular end users' devices, for example, televisions, radios, mobile content devices, telephones, computers, and others, and the copies 14, 15, 16 may be further processed depending on the distribution path and/or devices. The database 20 may be used for storing and/or organizing data related to the system via which associations among the data may be recorded and/or discovered.

The asset 11 may be an original, or master, version of a particular program. It may be preferred that the master version of a program be kept in as pristine a condition as possible. For example, the asset 11 may be an original analog tape of a program, or an original digital recording of a program. Accordingly, very little, if any, processing and/or conversion may be performed on the master version of a program, i.e., the asset 11. The asset 11 may be assigned a base identifier 21 that may constitute a unique identification number. For example, the unique identification number may be randomly generated. Any identification number assignment scheme may be used as long as each asset 11 is uniquely identified. Further, the base identifier 21 may be recorded in the database 20. All subsequent entries in the database related to the base identifier 21 of asset 11 may be linked to the base identifier 21 so that a positive identification of the asset 11 may be possible. The links to the base identifier 21 will be further discussed herein.

The asset 11 may also be assigned to a particular network 12 and made available to end users on that network 12. In this regard, the asset 11 may be made available to users during a specified window of time, for example, a certain number of hours, days, weeks, or months. The network 12 may be assigned an identification number that is unique from all other networks. Accordingly, the asset 11 may be scheduled for a network 12 by assigning a network identifier 22. The network identifier 22 may identify a currently assigned network 12, and may also identify a window of time during which the asset 11 will be available for access by users. Further, the network identifier 22 may be recorded in the database 20. In this regard, the network identifier 22 may be linked to the base identifier 21 in the database 20. By this link, it may be possible to identify the asset 11, the network 12 to which the asset 11 is assigned, and also the window of time during which the asset 11 is available on the network 12.

The asset 11 may be copied to create a mezzanine asset 13 that may function as the first working copy of the asset 11 because it is generally preferred to maintain the master version of a program unaltered. For example, the mezzanine asset 13 may be a converted digital version of an original analog asset 11, e.g., an analog tape. The mezzanine asset 13 may be processed and/or converted as necessary. For example, the mezzanine asset 13 may undergo data compression, loudness correction, and/or other data processing. Moreover, the mezzanine asset 13 may undergo watermarking by which it is assigned a watermark identifier 23. The watermark identifier 23 may include a unique identifier (which may constitute a unique identification number), a time stamp and/or other data types. The watermark identifier 23 may be inserted into the mezzanine asset 13 before any copies of the mezzanine asset 13 have been requested by end users. Thus, the mezzanine asset 13 acts as the first working copy from which all later copies of the program are derived. As a result, all subsequent copies derived from the mezzanine asset 13 will also include the watermark identifier 23. Further, the watermark identifier 23 may be recorded in the database 20. In this regard, the watermark identifier 23 may be linked to the network identifier 22 and the base identifier 21 in the database 20. By these links, it may be possible to identify the asset 11, the network 12 to which the asset 11 is assigned, and also the window of time during which the asset 11 is available on the network 12 by having knowledge of the watermark identifier 23 inserted into the mezzanine asset 13.

It may be possible to use the base identifier 21 of the asset 11 as the watermark identifier 23 of the mezzanine asset 13. However, if the base identifier 21 is a relatively long unique identification number, the inclusion of such a long unique identifier by watermarking into the mezzanine asset 13 may not be desirable. That is, the watermarking may become audible/visible to an end user or otherwise detrimentally affect the quality of the content. Further, there may be additional limitations on the length of a watermark identifier 23 imposed by the watermarking process itself. Accordingly, the watermark identifier 23 may be unique from the base identifier 21 due to these and other factors.

Based on the type of content, the time stamps inserted by watermarking for particular content may provide different data. For linear content, the time stamp may correlate to a time of day during which the program was scheduled to be broadcast. For example, if a program is linearly scheduled to be broadcast from 8:00 PM to 9:00 PM, the time stamps inserted by watermarking may include times between 8:00:00 PM and 9:00:00 PM, inclusive. Thus, one example time stamp may be 8:30:14 PM, which designates the 14 second mark after 8:30 PM. For nonlinear content, the time stamp may correlate to a time duration from the beginning of the program. For example, if a program is provided as nonlinear content and has a running time of exactly 2 hours, the time stamps inserted by watermarking may include times between 0:00:00, marking the beginning of the program, and 2:00:00, marking the end of the program, inclusive. Thus, one example time stamp may be 1:15:40, which designates the 1 hour, 15 minute, 40 second mark of the program measured from its beginning. Accordingly, time stamps for, for example, movies, videos, music, and/or other content having a running time, may provide data related to the running time of the asset 11. Moreover, time stamps are not necessary for, for example, photographs, images, or other content that does not have a running time, since an identification of a network and an asset is sufficient to fully identify access by end users of such static content.

The mezzanine asset 13 may then be copied, yielding any number of copies, for example, copies 14, 15, 16, as shown in FIG. 1. Although the exemplary embodiment of the system 10 shown in FIG. 1 illustrates only three copies 14, 15, 16, it is understood that any number of copies may be distributed to any number of end users. The copies 14, 15, 16 may be created from the mezzanine asset 13 when the content of the mezzanine asset 13 is requested by end users. In order to distribute copies to particular end users, copies 14, 15, 16 may require further processing such as, for example, data compression, modifications to aspect ratio, and/or alterations to bandwidth, depending on delivery needs, viewer types, and/or other variables of the requesting end users' devices. The further processing may include, for example, manipulation of video, audio and/or other aspects of copies 14, 15, 16 to meet each delivery system. For example, copy 14 may be requested for access on a computer, copy 15 may be requested for access on a television, and copy 16 may be requested for access on a mobile phone. In each case, the copies 14, 15, 16 may be processed in accordance with the delivery needs of each requesting user's device and/or distribution path. After completion of the processing, the copies 14, 15, 16 may then be distributed to the requesting end users.

Because the watermark identifier 23 is assigned to the mezzanine asset 13, and all subsequent copies 14, 15, 16 are created from the mezzanine asset 13, the watermark identifier 23 may remain with any subsequent copies 14, 15, 16. Thus, each copy 14, 15, 16 may be traced back to the network identifier 22 and the base identifier 21 in the database 20 via links with the watermark identifier 23. Additionally, if there are other processes in the path from the mezzanine asset 13 through distribution to the end user, the watermark identifier 23 may be carried through all the way to the end user, thereby allowing identification of the original asset 11 and network 12 by the links in the database 20.

For internal recording, tracking, deleting, scheduling, and/or other related tasks by an owner or distributor of the asset 11, each copy 14, 15, 16 may be further assigned a unique copy identifier (which may constitute a unique identification number). The copy identifiers may be used to identify each individual copy 14, 15, 16 of a mezzanine asset 13 since the watermark identifier 23 included in each copy is not unique to each copy, and thus does not differentiate one copy from any others. This information may be helpful in understanding media consumption and the distribution of content to various types of user devices. For example, if copies 14, 15, 16 are requested for access on a computer, a television, and a mobile phone, respectively, each copy may be assigned a copy identifier unique from any other copy identifier. As shown in FIG. 1, each copy 14, 15 may be assigned a unique copy identifier 24, 25, respectively. The copy identifier 24, 25 may be associated with a copy for a particular device or requesting user. Further, the unique copy identifiers 24, 25 may be recorded in the database 20. In this regard, the copy identifiers 24, 25 may also be linked to the watermark identifier 23, the network identifier 22, and the base identifier 21 in the database 20. In some situations, however, further processing prior to distribution to end users may be performed by entities outside the control of an owner or distributor of the asset 11, and those entities may be authorized to create additional copies of the mezzanine asset 13 for distribution. However, the owner or distributor may not be able to track each copy created and/or processed by such outside entities, and thus, a unique copy identifier may not be assigned by the owner or distributor to a copy, such as a copy 16 as shown in FIG. 1, for example. Nonetheless, a copy 16, as shown in FIG. 1, which is not assigned a unique copy identifier by the owner or distributor, may still be traced back to the network identifier 22 and the base identifier 21 in the database 20 via the watermark identifier 23 that is maintained in all copies of the mezzanine asset 13. Although the above discussion refers to an owner or distributor of an asset 11, it is understood that these designations may further include any individual or entity that is interested in tracking media consumption.

If the asset 11 is later reassigned to a different network 12, a unique network identifier 22 assigned to the new network 12 may be associated with the base identifier 21 of the asset 11 and the watermark identifier 23. The base identifier 21 of the asset 11 and the watermark identifier 23 of the mezzanine asset 13 may be maintained as previously recorded in the database 20. Thus, in an example embodiment, only a single base identifier 21 and a single watermark identifier 23 are used while the asset 11 is reassigned to and traverses multiple networks 12.

Accordingly, by the system 10 as shown in FIG. 1, media consumption may be tracked using a single watermark identifier 23 inserted into a mezzanine asset 13, by which the asset 11 and assigned network 12 may be credited when accessed by users. By tracing the links between the various identifiers 21, 22, 23, 24, 25 recorded in the database 20, an asset 11 and assigned network 12 for a copy 14, 15, 16 may be discovered. Thus, the database 20 may store a heritage of links of the various identifiers starting from the base identifier 21 all the way through the distribution chain to copies delivered to end users. Although FIG. 1 shows only a single database 20, it is understood that other embodiments of the database structure may be used, for example, including multiple databases, as long as operative links are maintained between the various identifiers, as shown in FIG. 1. Further, media consumption may be tracked across multiple distribution paths, e.g., multiple copies 14, 15, 16 that may be further processed, and across multiple network reassignments using a single watermark identifier 23 by which to credit the asset 11 and assigned network 12.

Figure 2:
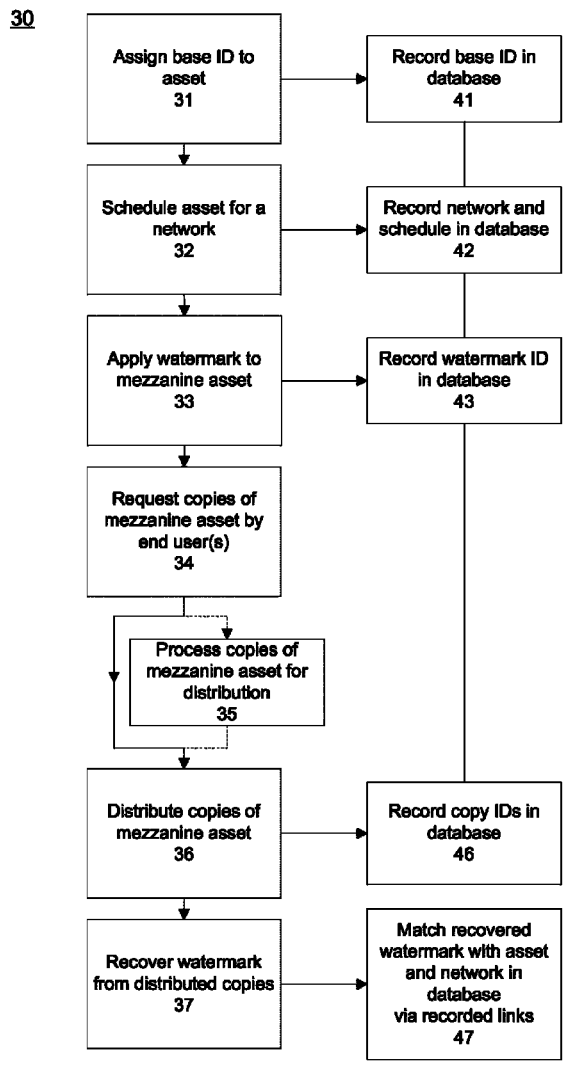
FIG. 2 is a schematic flow diagram illustrating an exemplary method of tracking media consumption according to an example embodiment of the present invention.

FIG. 2 illustrates a schematic flow diagram of an exemplary method 30 of tracking media consumption according to an example embodiment of the present invention. The exemplary method 30 as shown in FIG. 2 is discussed herein with reference to the exemplary system 10 as shown in FIG. 1.

At step 31, a base identifier 21 may be assigned to an asset 11 that may be an original, or master, version of a particular program. The base identifier 21 may uniquely identify a particular asset 11, and may constitute a unique identification number. At step 41, the base identifier 21 of the asset 11 may be recorded in a database 20. All subsequent entries in the database related to the base identifier 21 of asset 11 may be linked to the base identifier 21 so that a positive identification of the asset 11 may be possible.

At step 32, the asset 11 may be assigned to a particular network 12 and made available to end users on that network 12. In this regard, the asset 11 may be made available to users during a specified window of time, for example, a certain number of days, weeks, or months. The network 12 may be assigned a unique identification number. A network identifier 22 may be assigned to the asset 11 that may identify a currently assigned network 12, and may also identify a window of time during which the asset 11 will be available for access by users. At step 42, the network identifier 22 may be recorded in the database 20. The network identifier 22 may be linked to the base identifier 21 in the database 20. By this link, it may be possible to identify the asset 11, the network 12 to which the asset 11 is assigned, and also the window of time during which the asset 11 is available on the network 12.

At step 33, the asset 11 may be copied to create a mezzanine asset 13 that may function as the first working copy of the asset 11 because it is generally preferred to maintain the master version of a program unaltered. The mezzanine asset 13 may be processed and/or converted as necessary. For example, the mezzanine asset 13 may undergo data compression, loudness correction, and/or other data processing. Moreover, the mezzanine asset 13 may undergo watermarking by which a watermark identifier 23 is inserted into the mezzanine asset 13. The watermark identifier 23 may include a unique identifier (which may constitute a unique identification number), a time stamp and/or other data types, as described above. The watermark identifier 23 may be inserted into the mezzanine asset 13 before any copies of the mezzanine asset 13 have been requested by end users. Thus, the mezzanine asset 13 acts as the first working copy from which all later copies of the program are derived. As a result, all subsequent copies derived from the mezzanine asset 13 will also include the watermark identifier 23. At step 43, the watermark identifier 23 may be recorded in the database 20. The watermark identifier 23 may be linked to the network identifier 22 and the base identifier 21 in the database 20. By these links, it may be possible to identify the asset 11, the network 12 to which the asset 11 is assigned, and also the window of time during which the asset 11 is available on the network 12 by having knowledge of the watermark identifier 23 inserted into the mezzanine asset 13.

At step 34, copies 14, 15, 16 of the mezzanine asset 13 may be requested by end users. Although the exemplary embodiment of the system 10 shown in FIG. 1 illustrates only three copies 14, 15, 16, it is understood that any number of copies may be distributed to any number of end users. The copies 14, 15, 16 may be created based on the mezzanine asset 13 including the watermark identifier 23.

At step 35, the copies 14, 15, 16 may require further processing such as, for example, data compression, modifications to aspect ratio, and/or alterations to bandwidth, depending on delivery needs, viewer types, and/or other variables. The further processing may include, for example, manipulation of video, audio and/or other aspects of copies 14, 15, 16 to meet each delivery system. For example, copy 14 may be requested for access on a computer, copy 15 may be requested for access on a television, and copy 16 may be requested for access on a mobile phone. In each case, the copies 14, 15, 16 may be processed in accordance with the delivery needs of each requesting user's device or distribution path. Alternatively, if no further processing is required, the method 30 may skip step 35 and proceed directly to step 36.

At step 36, the copies 14, 15, 16, after completion of any further processing, if required, may be distributed to end users. Because the watermark identifier 23 is assigned to the mezzanine asset 13, and all subsequent copies 14, 15, 16 are created from the mezzanine asset 13, the watermark identifier 23 may remain with any subsequent copies 14, 15, 16. Thus, each copy 14, 15, 16 may be traced back to the network identifier 22 and the base identifier 21 in the database 20 via links with the watermark identifier 23. Additionally, if there are other processes in the path from the mezzanine asset 13 through distribution to the end user, the watermark identifier 23 may be carried through all the way to the end user, thereby allowing identification of the original asset 11 and network 12 by the links in the database 20.

For internal recording, tracking, deleting, scheduling, and/or other related tasks by an owner or distributor of an asset 11, each copy 14, 15, 16 may be further assigned a unique copy identifier, in order to differentiate each copy from any others. For example, if copies 14, 15, 16 are requested for access on a computer, a television, and a mobile phone, respectively, each copy may be assigned a copy identifier unique from any other copy identifier. At step 46, the unique copy identifiers may be recorded in the database 20, and the copy identifiers may be linked to the watermark identifier 23, the network identifier 22, and the base identifier 21 in the database 20. In some situations, however, further processing prior to distribution to end users may be performed by entities outside the owner or distributor, and those entities may be authorized to create additional copies of the mezzanine asset 13 for distribution. However, the owner or distributor may not be able to track each copy created and/or processed by such outside entities, and thus, a unique copy identifier might not be assigned by the owner or distributor to a copy, such as a copy 16 as shown in FIG. 1, for example. Nonetheless, a copy 16, as shown in FIG. 1, which is not assigned a unique copy identifier by an owner or distributor, may still be traced back to the network identifier 22 and the base identifier 21 in the database 20 via the watermark identifier 23 that is maintained in all copies of the mezzanine asset 13. Although the above discussion refers to an owner or distributor of an asset 11, it is understood that these designations may further include any individual or entity that is interested in tracking media consumption.

At step 37, the watermark identifier 23 may be recovered from distributed copies 14, 15, 16. The watermark identifier 23 may be recovered by a data collection device that listens to (in the case of audio watermarks) and/or views (in the case of video watermarks) the content as it is output to an end user. Further, the watermark identifier 23 may be processed by the data collection device and/or at other processing center(s) and delivered to an entity interested in tracking and analyzing such data. At step 47, using the watermark identifier 23, the particular copy 14, 15, 16 may be traced back to the original asset 11 and assigned network 12 via links in the database 20 between the various identifiers 21, 22, 23, 24, 25. That is, the watermark identifier 23 may be matched with the network identifier 22 of the network 12 to which it is linked in the database 20, thereby identifying the assigned network 12. Then, the watermark identifier 23 may be matched with the base identifier 21 of the asset 11 to which it is linked in the database 20, thereby identifying the asset 11. Thus, by the use of a single watermark identifier 13 and the links between various identifiers in the database 20, an asset 11 and assigned network 12 for a particular copy accessed by an end user may be identified.

Following the identification of the asset 11 and assigned network 12, the appropriate credits to the asset 11 and network 12 may be applied. Further, if the watermark identifier 23 also included a time stamp, the appropriate credits to the asset 11 and network 12 may be adjusted based on the time stamp. For example, the duration of the play and/or an identification of what portion of the content was accessed may be recorded in the retrieved time stamps of the watermark identifier 23. In addition, further data included in the watermark identifier 23 may be used to adjust the appropriate credits applied to the asset 11 and network 12.

Moreover, if the asset 11 is later reassigned to a different network 12, a unique network identifier 22 assigned to the new network 12 may be associated with the base identifier 21 of the asset 11 and the watermark identifier 23. Thus, at step 32, the asset 11 may be scheduled for the new network 12, and at step 42, the network identifier 22 of the new network 12 may be recorded in the database 20, which network identifier 22 may be linked to the base identifier 21 in the database 20. However, steps 31 and 33 of the method 30 need not be repeated because the base identifier 21 of the asset 11 and the watermark identifier 23 of the mezzanine asset 13 may be maintained as previously recorded in the database 20. Thus, in an example embodiment, only a single base identifier 21 and a single watermark identifier 23 are used while the asset 11 is reassigned to and traverses multiple networks 12.

Accordingly, by the method 30 as shown in FIG. 2, media consumption may be tracked using a single watermark identifier 23 inserted into a mezzanine asset 13 at step 33, by which the asset 11 and assigned network 12 may be credited when accessed by end users. By tracing the links between the various identifiers 21, 22, 23, 24, 25 recorded in the database 20, an asset 11 and assigned network 12 for a copy 14, 15, 16 may be discovered after recovering the watermark identifier 23 at step 37. Thus, a heritage of links of the various identifiers may be stored in the database 20 starting from the base identifier 21 at steps 31, 41 all the way through the distribution chain to copies delivered to end users at steps 36, 46. Further, media consumption may be tracked across multiple distribution paths, e.g., multiple copies 14, 15, 16 that may be further processed at step 35 and distributed at step 36, and across multiple network reassignments at step 32, using a single watermark identifier 23 by which to credit the asset 11 and assigned network 12.

An example embodiment of the present invention is directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, as a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware-implemented computer readable media, e.g., as described above, having stored thereon instructions executable by a processor, which, when executed, cause one or more processors to perform the example methods described above, or portions thereof.

An example embodiment of the present invention is directed to a method of transmitting instructions executable by one or more processors, the instructions, when executed, causing the processor(s) to perform the example methods described above, or portions thereof.

An example embodiment of the present invention is directed to a watermarking paradigm as described above, which may include one or more memory devices, such as described above, storing one or more, e.g., all, of the IDs described above, and/or which may include one or more processing devices, such as those described above, for implementing the described methods using the stored IDs.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method of watermarking content for tracking of media consumption, the method comprising:
   obtaining, by a computer processor, a mezzanine asset that includes a watermark identifier;
   creating, by the computer processor, at least one copy of the mezzanine asset for distribution to at least one end user; and
   wherein:
      the at least one copy includes a copy of the watermark identifier that is included in the mezzanine asset;
      the mezzanine asset is not in condition for distribution to the at least one end user; and
      the at least one copy is further processed for distribution to the at least one end user.

2. The method of claim 1, wherein the at least one copy is provided as a video-on-demand.

3. The method of claim 1, wherein the mezzanine asset is generated by copying an asset to which a base identifier unique to the asset is assigned.

4. The method of claim 3, wherein:
the mezzanine asset is assigned to a network, the assignment to the network being recorded by a link between the watermark identifier and a network identifier; and
the network identifier includes at least one of a unique identifier and a window of time during which the mezzanine asset is available on the network.

5. The method of claim 4, wherein:
the base identifier, the network identifier, and the watermark identifier are recorded, and linked to each other, in a database.

6. The method of claim 4, wherein the at least one copy includes a copy identifier.

7. The method of claim 6, wherein the copy identifier includes a unique identifier.

8. The method of claim 6, further comprising:
recording the copy identifier in the database; and
linking the copy identifier to the base identifier, the network identifier, and the watermark identifier in the database.

9. The method of claim 1, wherein the watermark identifier includes at least one of a unique identifier and a time stamp.

10. The method of claim 9, wherein the time stamp is relative to a start of a running time of the mezzanine asset.

11. The method of claim 1, wherein the watermark identifier is at least one of an audio watermark and a video watermark inserted into the mezzanine asset.

12. The method of claim 1, wherein the further processing of the at least one copy of the mezzanine asset is based on requirements of the at least one end user, the at least one copy maintaining the copy of the watermark identifier after the processing.

13. The method of claim 1, further comprising:
distributing the at least one copy of the mezzanine asset to the at least one end user.

14. The method of claim 13, wherein the watermark identifier of the at least one copy distributed to the at least one end user is identifiable by an end user device and is processable for determining the asset and the network to which the at least one copy is linked based on links between the base identifier, the network identifier, and the watermark identifier in the database.

15. The method of claim 14, wherein, after reassignment of the mezzanine asset to another network, the reassignment occurring subsequent to creation of the mezzanine asset including the watermark identifier, the watermark identifier is processable for identifying the another network by a change of a link from the watermark identifier to point to a different network identifier assigned to the another network.

16. The method of claim 1, wherein the mezzanine asset includes at least one of video content and audio content.

17. The method of claim 1, wherein the mezzanine asset includes media provided to the at least one end user, via the at least one copy, as at least one of a movie, a television show, a radio show, and Web content.

18. A hardware computer-readable medium having stored thereon instructions executable by a processor, the instructions which, when executed by the processor, cause the processor to perform a method of tracking media consumption, the method comprising:
obtaining a mezzanine asset that includes a watermark identifier;
creating at least one copy of the mezzanine asset for distribution to at least one end user; and
wherein:
the at least one copy includes a copy of the watermark identifier that is included in the mezzanine asset;
the mezzanine asset is not in condition for distribution to the at least one end user; and
the at least one copy is further processed for distribution to the at least one end user.

19. A transmission method comprising:
transmitting instructions executable by a processor, the instructions which, when executed by the processor, cause the processor to perform a method of tracking media consumption, the tracking method comprising:
obtaining a mezzanine asset that includes a watermark identifier;
creating at least one copy of the mezzanine asset for distribution to at least one end user; and
wherein:
the at least one copy includes a copy of the watermark identifier that is included in the mezzanine asset;
the mezzanine asset is not in condition for distribution to the at least one end user; and
the at least one copy is further processed for distribution to the at least one end user.

20. A system for tracking media consumption, comprising:
a computer processor configured to:
obtain a mezzanine asset that includes a watermark identifier; and
create at least one copy of the mezzanine asset for distribution to at least one end user; and
wherein:
the at least one copy includes a copy of the watermark identifier that is included in the mezzanine asset;
the mezzanine asset is not in condition for distribution to the at least one end user; and
the at least one copy is further processed for distribution to the at least one end user.

21. A computer-implemented method for tracking media consumption, the method comprising:
obtaining, by a computer processor, information regarding a copy of a watermark wherein the copy of the watermark is in a consumed copy of a media asset assigned to a network;
based on identification links, determining, by the processor, an asset identification and a network identification to which the watermark is linked;
based on the determination, recording, by the processor, a consumption of the asset in association with the network; and
wherein:
the consumption of the consumed copy is by an end user;
the consumed copy was created by copying a mezzanine asset;
the mezzanine asset includes the watermark and is not in condition for distribution to the end user;
the watermark copy that is in the consumed copy is a copy of the watermark included in the mezzanine asset;
after the creation of the consumed copy, the consumed copy was further processed for distribution to the at least one end user.

22. A computer-implemented method for tracking media consumption, the method comprising:
storing an identification of a media asset;
storing an identification of a network to which the asset is assigned;

generating, by a computer processor, a base copy of the media asset, wherein the base copy includes a watermark processable for tracking consumption of the media asset;

storing an identification of the base copy;

linking the stored base copy identification, the stored network identification, and the stored asset identification; and responsive to each of a plurality of end user requests for the media asset:

generating, by the processor, a respective copy of the base copy; and transmitting, by the processor, the respective copy of the base copy; and wherein:

each of the respective copies includes a copy of the watermark that is included in the base copy;

the base copy is not in condition for end user distribution in response to any of the plurality of end user requests for the media asset; and each of the respective copies is further processed for end user distribution in response to a respective one of the plurality of end user requests for the media asset.

23. The method of claim 22, wherein the respective copies are provided as videos-on-demand.

24. The method of claim 1, wherein the copy of the watermark identifier is usable for determining how the media has been consumed in a consumption occurring subsequent to the creating.

25. The method of claim 1, wherein the copy of the watermark is usable to identify information about a viewing of the media that occurs subsequent to the creating.

26. A computer-implemented method of watermarking content for tracking of media consumption, the method comprising:

obtaining, by a computer processor, a mezzanine asset that includes a watermark identifier;

creating, by the computer processor, at least one copy of the mezzanine asset; and wherein:

each of the at least one copy is distributed to an end user responsive to an end user request for content;

the mezzanine asset is not distributed in response to any end user request for content and is not in condition for distribution to the end user;

each of the at least one copy includes a respective copy of the watermark identifier that is included in the mezzanine asset; and each of the at least one copy is further processed for distribution to the end user to which it is distributed.

\* \* \* \* \*